(12) United States Patent
Shin et al.

(10) Patent No.: US 10,335,755 B1
(45) Date of Patent: Jul. 2, 2019

(54) PRESSURIZED TAYLOR VORTEX REACTOR

(71) Applicant: Energy, United States Department of, Washington, DC (US)

(72) Inventors: Youngho Shin, La Grange Highlands, IL (US); Ozgenur Kahvecioglu Feridun, Naperville, IL (US); Gregory K. Krumdick, Homer Glen, IL (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/976,916

(22) Filed: May 11, 2018

(51) Int. Cl.
*B01J 3/04* (2006.01)
*B01J 3/02* (2006.01)

(52) U.S. Cl.
CPC . *B01J 3/04* (2013.01); *B01J 3/02* (2013.01); *B01J 2203/068* (2013.01)

(58) Field of Classification Search
CPC ..................................... B01J 3/02; B01J 3/04
USPC ....................................................... 422/224
See application file for complete search history.

(56) References Cited

U.S. PATENT DOCUMENTS

| | | | | |
|---|---|---|---|---|
| 4,095,955 A * | 6/1978 | Stambaugh | ............... | C10L 9/02 201/17 |
| 6,471,392 B1 * | 10/2002 | Holl | ......................... | B01F 7/12 366/279 |
| 7,964,301 B2 * | 6/2011 | Fischel | .................. | B01J 12/007 429/67 |
| 8,080,165 B2 * | 12/2011 | Fomey | ...................... | A23L 3/28 210/748.01 |
| 2004/0126273 A1 * | 7/2004 | Fomey | ...................... | A23L 3/28 422/22 |
| 2009/0053811 A1 * | 2/2009 | Black | ...................... | C12M 27/10 435/384 |
| 2009/0241530 A1 * | 10/2009 | Rampen | ................. | F03C 1/0447 60/327 |
| 2010/0048930 A1 * | 2/2010 | Elst | .......................... | C07C 67/03 554/174 |
| 2010/0170147 A1 * | 7/2010 | McNeff | .................... | C10B 19/00 44/605 |
| 2015/0158087 A1 * | 6/2015 | Di Luca | .................... | B22F 9/20 420/424 |

* cited by examiner

Primary Examiner — Huy Tram Nguyen
(74) Attorney, Agent, or Firm — Karen L. Blouin; Michael J. Dobbs; Brian J. Lally

(57) ABSTRACT

A reaction apparatus includes a hollow chamber with a stirring shaft. The chamber is maintained at a predetermined pressure and accepts at least two reactants from two storage tanks. The stirring shaft rotates around an axis and creates a reaction product. Taylor vortexes are created while the pressure minimizes the volume possession of the gas phase. The reaction product of micron and sub-micron particles is removed from the chamber and depressurized.

17 Claims, 6 Drawing Sheets

PRESSURIZED TAYLOR VORTEX REACTOR

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to a pressurized Taylor Vortex reactor.

BACKGROUND OF THE INVENTION

A Taylor Vortex reactor is used as an advanced mixing reactor for the continuous manufacturing of active material precursors for batteries which also have applications in the fields of (co-)precipitation, (re-)crystallization, photo-catalytic reactions, polymerization, sol-gel process, coatings, filtration and biological systems. The Taylor Vortex reactor is composed of two co-axially positioned cylinders with a gap in between where the reaction proceeds with the Taylor Vortex flow induced by the rotation of the inner cylinder.

A Taylor Vortex reactor has a well-defined flow regime with a unique flow behavior (Taylor fluid flow) which promotes a high degree of uniform super-saturation in the circumferential direction of the reactor. Therefore, this reactor results in a sharp particle size distribution with uniform morphology compared to Continuous Stirred Tank Reactor (CSTR) which is commonly used for the synthesis of cathode precursors for batteries in the industry. The Taylor Vortex flow provides a homogenous intense micro-mixing zone and produces spherical particles with narrow particle size distribution.

However, conventional Taylor Vortex reactors are used for liquid-phase reactions under atmospheric pressure. When gas-phase bubbles are generated during a reaction, they are trapped in Taylor vortices. If there is a considerable portion of gas-phase reaction together with liquid-phase reaction in the Taylor Vortex reactor, it is more difficult to form Taylor fluid flow because of the lowered viscosity by gas-phase and the reaction time (residence time) decreases because of the possession of reactor volume by gas-phase which seriously deteriorates the chemical reactivity, particle growth and morphology caused by it. Accordingly there is a need for a reaction apparatus that provides a pressurized Taylor vortex reaction minimizing the volume fraction of the gas phase involved in the reaction.

SUMMARY OF THE INVENTION

According to one aspect of the invention, a reaction apparatus for mixing at least two reactants includes a reactor. The reactor has a chamber, a stirring shaft, multiple inlet ports, and an outlet port. There is hollow space inside the chamber which lies along an axis x. The chamber has a predetermined pressure of at least 1 bar. At least two reactants are received in the chamber and a stirring shaft which is positioned in the hollow space of the chamber rotates and forms a reaction product. A depressurizer is connected to an outlet port and depressurizes the reaction product. A storage tank is connected to the depressurizer and receives the reaction product.

In another aspect of the invention, the reaction apparatus may also include a heat exchanger that cools the reaction product. In some instances one or all of the reactants may be heated before entering the chamber.

The present invention provides a technical advantage in forming submicron and/or micron-sized active particles by co-precipitation. In addition the present invention allows for materials or their precursors for a lithium secondary battery to be produced continuously by a co-precipitation reaction at above boiling temperature of reaction media and atmospheric pressure. In addition, the present invention may be used in a wide variety of chemical reactions such as precipitation, crystallization, photo-catalytic reactions, polymerization, sol-gel process, coatings, filtration and biological systems.

BRIEF DESCRIPTION OF THE DRAWINGS

These and further aspects of the invention and their advantages can be discerned in the following detailed description in which like characters denote like parts and in which.

DETAILED DESCRIPTION OF THE INVENTION

Figure 1:
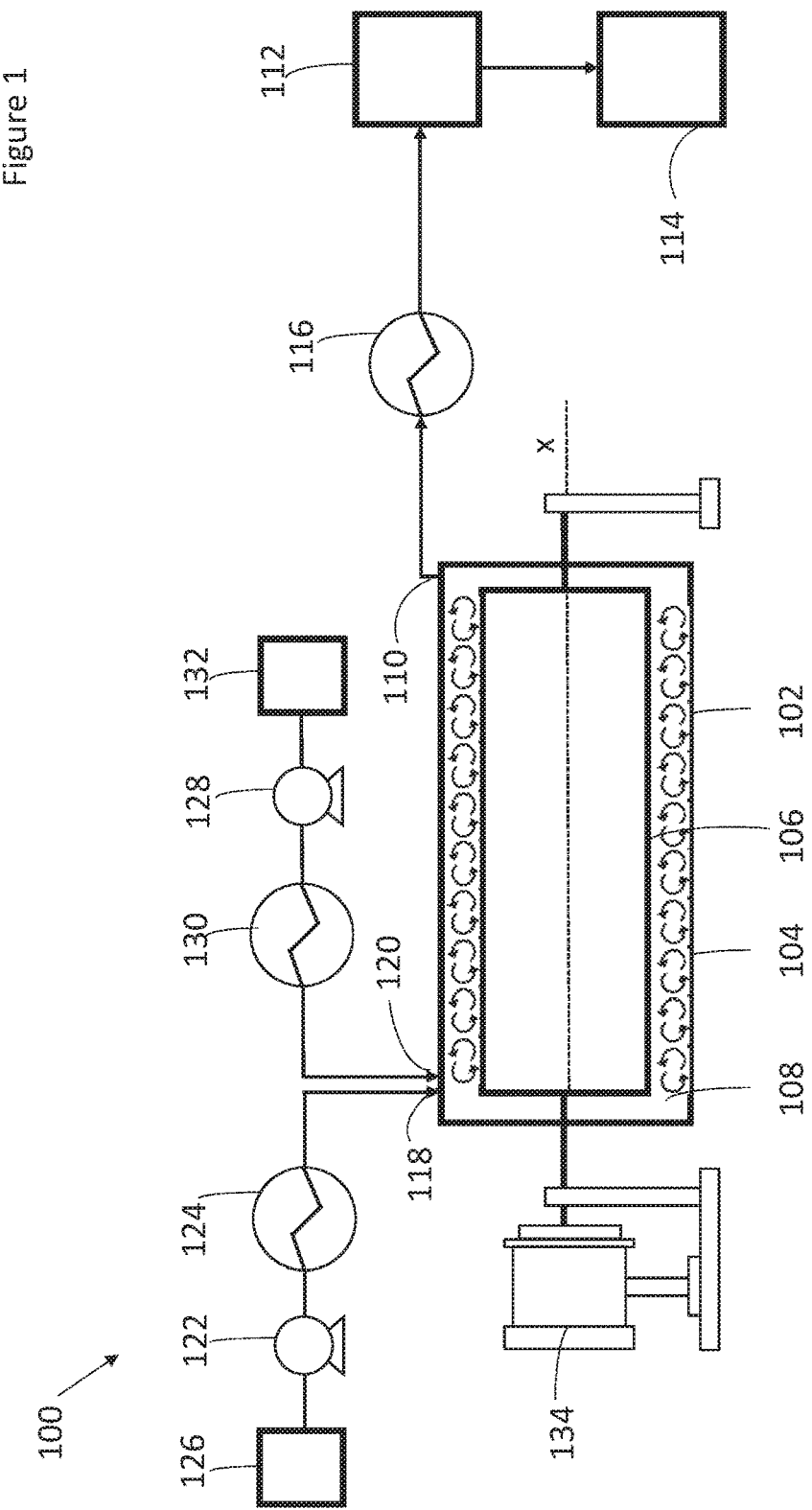
FIG. 1 is a first embodiment of the reaction apparatus according to the invention.

The present invention provides a reaction apparatus 100 used to mix at least two reactants. The embodiment shown in FIG. 1 is for two reactants. Other embodiments may have more reactants. The reaction apparatus 100 has a cylindrical chamber 104. The chamber 104 has a hollow space 108 and a circumferential wall 102 defining the hollow space 108. Alternate embodiments may have chambers 104 of a non-cylindrical shape such that acceptable results are obtained. The chamber has an axis x which runs through the longitudinal midpoint of the chamber 104.

A cylindrical stirring shaft 106 is rotatably mounted in the hollow space 108 such that the stirring shaft 106 rotates around axis x. The chamber 104 and stirring shaft 106 are co-axially positioned cylinders. The chamber 104 and stirring shaft 106 are sized such that a Taylor Vortex flow occurs in the gap 108 when the stirring shaft 106 rotates.

The chamber 104 has a predetermined pressure of at least approximately 1 bar. In alternate embodiments the chamber has a predetermined pressure of between approximately 1 and 220 bars. In the embodiment illustrated in FIG. 1, the pressure of the chamber 104 is created by the chamber 104 receiving at least one reactant that has a pressure of at least approximately 1 bar. The pressure of the chamber 104 would be equivalent to the pressure of the reactant. In alternate embodiments the pressure of the chamber 104 is created via any means that provides acceptable results. The chamber 104 must be able to hold the reactants at a pressure that is different than the ambient pressure.

In the embodiment illustrated in FIG. 1, the chamber 104 receives at least two reactants. Alternate embodiments may receive more than two reactants. The chamber 104 has at least two inlet ports 118, 120 through which it receives the reactants. The inlet ports 118 and 120 are located at one end of the chamber 104 and the outlet port 110 is located at the other end of the chamber, so there is no section where the flow of reactants in the chamber 104 is stagnant. As illustrated in FIG. 1, the inlet port 118 is connected to a heat exchanger 124. The heat exchanger 124 heats the respective reactant to at least approximately 50° Celsius. In alternate embodiments the reactant is heated to between approximately 50° and 374° Celsius. The heat exchanger 124 receives the respective reactant from a pressure pump 122. The pressure pump 122 pumps the respective reactant from the storage tank 126 to the heat exchanger. The storage tank 126 stores the respective reactant at a predetermined pressure. In one embodiment the predetermined pressure is approximately 1 bar.

The same configuration is repeated for the second reactant. The inlet port 120 is connected to a heat exchanger 130. The heat exchanger 130 heats the respective reactant to at least approximately 50° Celsius. In alternate embodiments the reactant is heated to between approximately 50° and 374° Celsius. The heat exchanger 130 receives the respective reactant from a pressure pump 128. The pressure pump 128 injects the respective reactant into the heat exchanger from the storage tank. The storage tank 132 stores the respective reactant at a predetermined pressure. In one embodiment the predetermined pressure is approximately 1 bar.

In alternate embodiments only one of the two reactants may be pressurized and heated in which case there would only be one pressure pump 122, 128 and one heat exchanger 124, 130. In yet further embodiments there may not be a storage tank 126, 132 for either reactant. In still further embodiments the chamber 104 may be pressurized to a predetermined of at least approximately 1 bar. In alternate embodiments the predetermined pressure may be between approximately 1 and 220 bars. In further embodiments the chamber 104 may have a temperature of at least approximately 50° Celsius. In yet further embodiments each of the at least two reactants may be at ambient temperature and pressure when they enter the chamber 104 at the inlet ports 118, 120. In alternate embodiments both reactants and the chamber 104 may be at ambient temperature. Additionally, electric or gas fired heaters may be used in place of a heat exchanger 124, 130.

In configurations in which there are more than two reactants, there are additional inlet ports 118, 120, additional heat exchangers 124, 130, pumps 124, 128, and storage tanks 126, 132 as required by the specific application. In all embodiments any conduit, tubing, piping or other material may be used to transport the reactants. The material chosen must be able to withstand the pressure that the respective reactant has achieved at various points. Any material, conduit, tubing or piping may be used as long as acceptable results are obtained.

The rotation of the stirring shaft 106 creates Taylor vortex flow in the gap 108 between the stirring shaft 106 and the circumferential wall 102. This new reactor has a well-defined flow regime with a unique flow behavior (Taylor fluid flow) which promotes a high degree of uniform super-saturation in the circumferential direction of the chamber 104 thus results in a sharp particle size distribution with uniform morphology in the product suspension of the receiving outlet. The flow inside the reactor provides high mass transfer and homogeneous micro-mixing by using Taylor vortices; hence it displays 3-times more mass transfer rate and 7-times more strong agitation power than that of existing tank-type reactor. In addition, this reactor shortens the reaction time with its strong agitation capability and removes dead-zones which thereby, boosts the purity, density, particle size and distribution, crystallization degree, impurity removal ratio, etc. and thus increases manufacturing efficiency more than the existing reactors.

In the illustrated embodiment the stirring shaft 106 is attached to a drive motor 134 that provides rotational force to the stirring shaft 106. In one embodiment the stirring shaft 106 rotates at a speed of approximately 100-2000 rpm. In other embodiments the stirring shaft 106 has a speed that is application specific.

After the high pressure mixing has occurred, a reaction product is formed. The reaction product is discharged from an outlet port 110 located at one end of the chamber 104 such that the outlet port 110 and the inlet ports 118, 120 are at opposing ends of the chamber relative to axis x. The reaction product is injected into the heat exchanger 116 to be cooled. The cooled high pressure reaction product is depressurized by the depressurizer 112. If there are solid particles in the reaction product, the depressurizer 112 may be a capillary pressure let down apparatus. Specifically, a capillary pressure let down apparatus may be used if the density of solid particles is between 1.5 and 7 gram/cc, when the size of solid particles is between 0.5 and 50 microns, and when the content of the solid particles is between 1 and 30 percent of the reaction product. If there are no solid particles in the reaction product or solid particles do not meet the identified criteria, the depressurizer 112 may be a pressure-reducing regulator. In alternate embodiments the depressurizer 112 may be any device that yields acceptable results. After depressurization, the cooled and depressurized reaction product is stored in a storage tank 114. The predetermined pressure of the chamber 104 will be approximately constant between the pressure pumps 122, 128 and the depressurizer 112.

As with the reactants, the reaction product is transported from the outlet port 110 to the depressurizer 112 to a storage tank 114 by conduit, tubing, piping or other material that achieves acceptable results. The material chosen must be able to withstand the pressure that the respective reactant has achieved at various points. Any material, conduit, tubing or piping may be used as long as acceptable results are obtained. The storage tank 114 has a pressure from approximately 1-20 bar.

Figure 2:
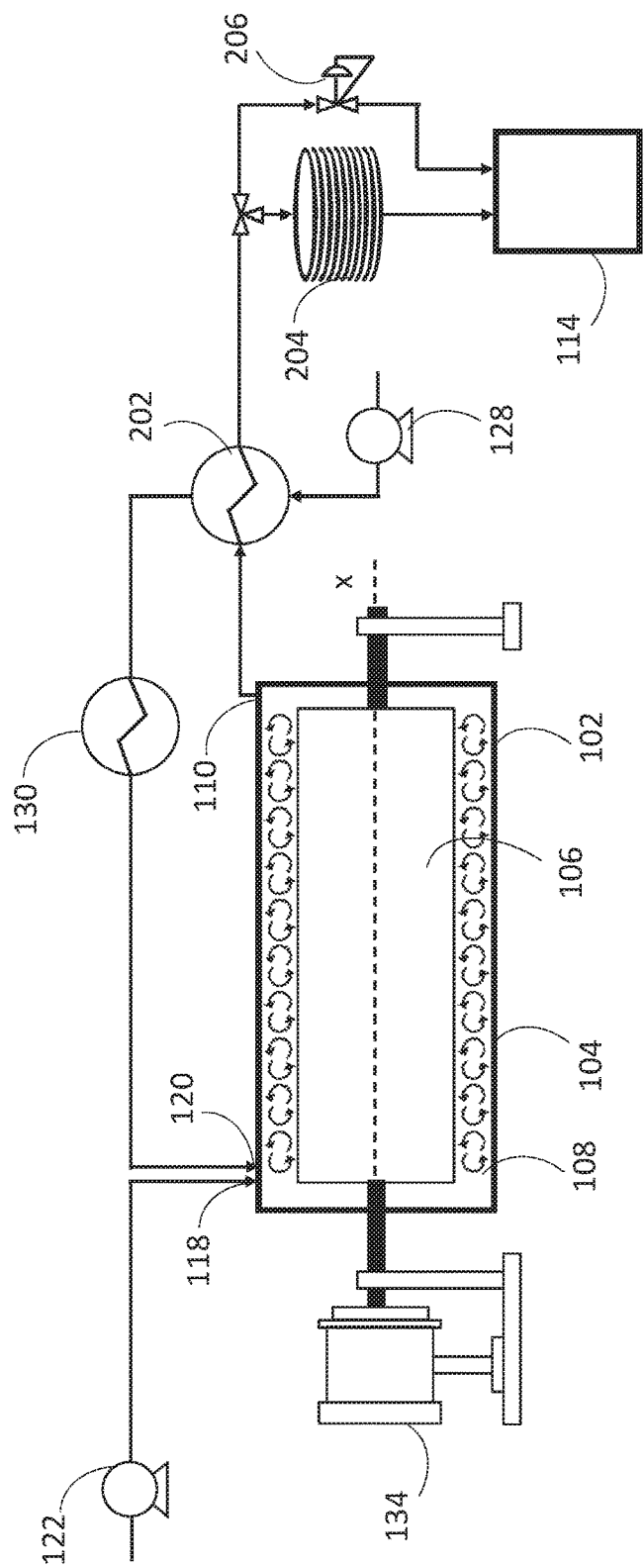
FIG. 2 is a second embodiment of the reaction apparatus according to the invention.

A second embodiment of the reaction apparatus is shown in FIG. 2. In this embodiment, one pressurized reactant is injected into the chamber 104 by a high pressure pump 122 via inlet port 118. The second reactant is injected into a heat exchanger 202 via a high pressure pump 128. However, in this embodiment, the heat from the reaction product heats the room temperature reactant in the heat exchanger 202. An additional heat exchanger 130 heats the reactant to a range of approximately 50° C. to 374° C. The reactant with the larger flow rate is typically the one that is heated.

As illustrated in FIG. 2, a capillary pressure letdown apparatus 204 depressurizes the reaction product when there are solid particles present. A pressure-reducing regulator 206 depressurizes the reaction product when there are no solid particles present.

Figure 3:
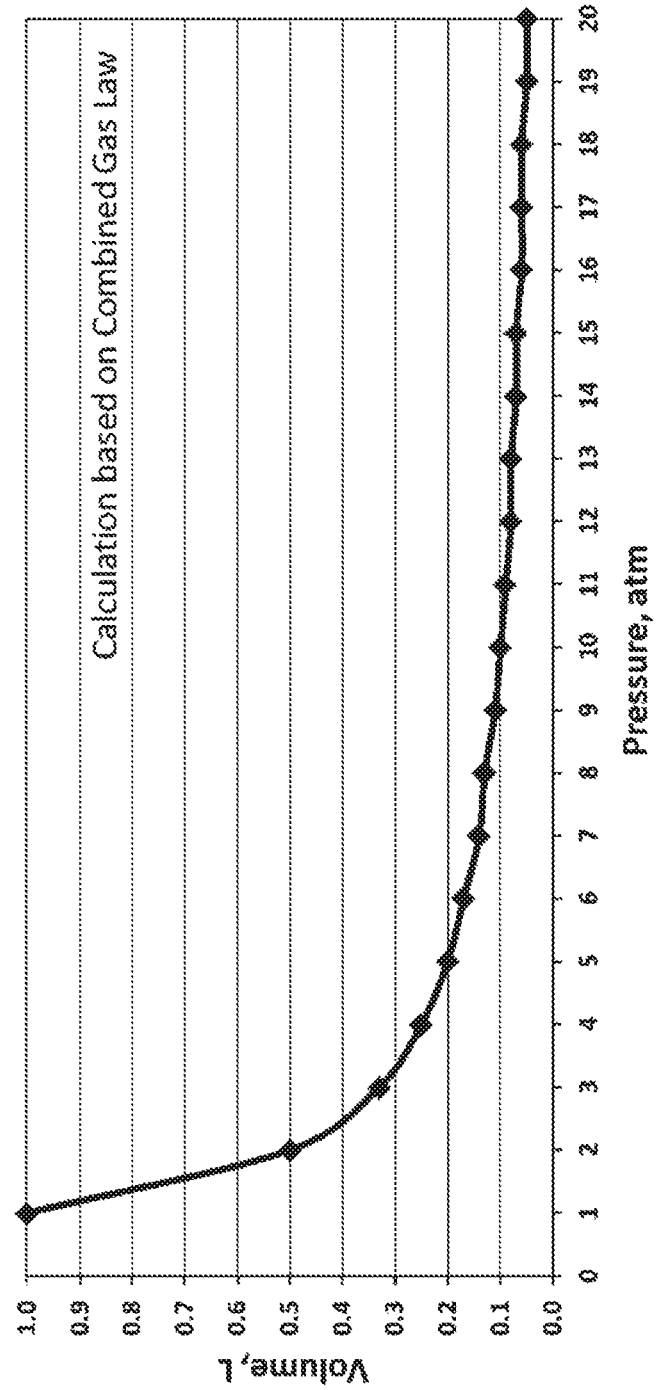
FIG. 3 is a graph of the volume change for one liter gas according to pressure at 50 degrees Celsius.

The pressurized reaction apparatus with depressurizer (capillary pressure let down apparatus 204 or pressure-reducing regulator 206) results in improved formation of the Taylor fluid flow. In addition the reduction of reaction time (residence time) is mitigated by minimizing the possession of reactor volume by gas phase. After depressurizing, the reaction product is stored in storage tank 114. FIG. 3 illustrates an example of one liter gas volume according to pressure at 50 C. One liter at 1 atmosphere decreases to 0.1 liter at 10 atmosphere at the same temperature which means 90% gas-phase volume reduction in Taylor Vortex reactor by pressurizing.

Figure 4:
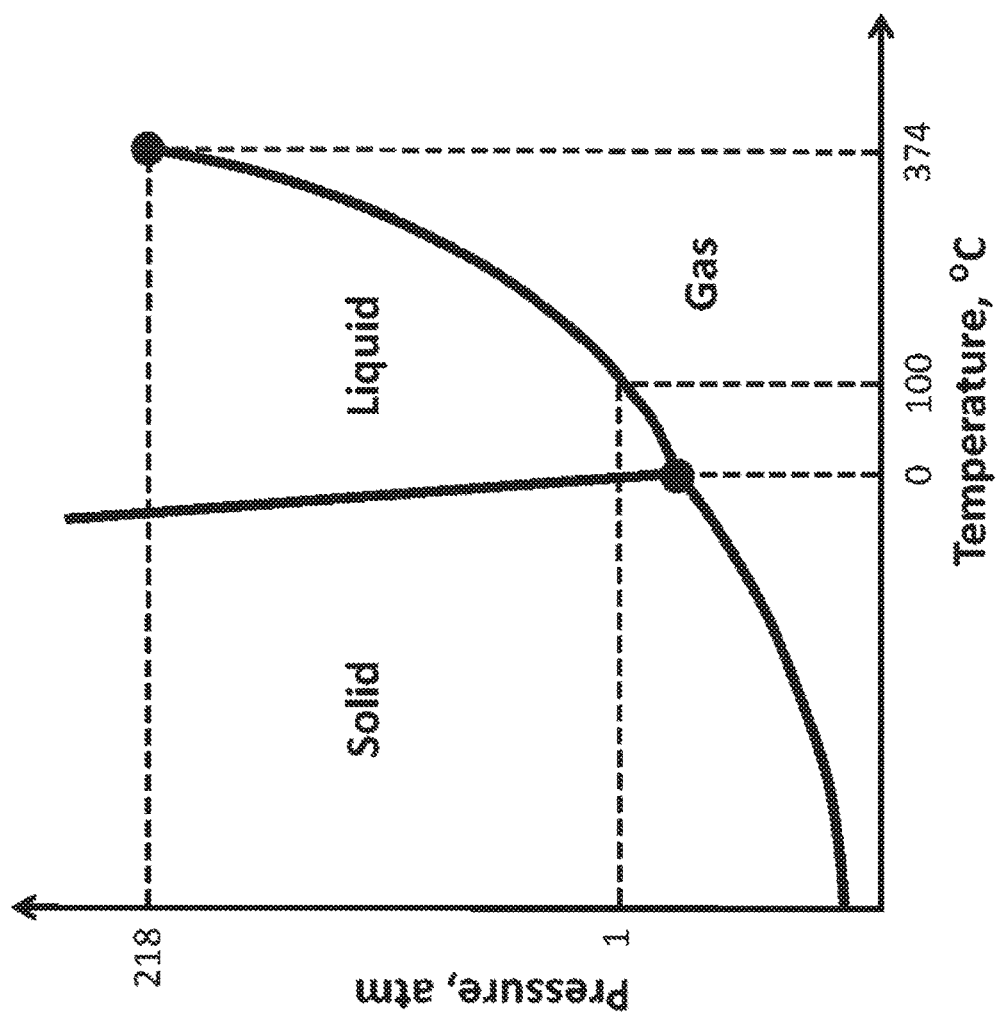
FIG. 4 is a phase diagram of water.

Water is commonly used as a reaction media to produce active material or its precursor. For some active materials or precursors, reaction temperature higher than 100 C (boiling point of water) generates better particle properties such as morphology, size, size distribution and density which are critical of the performance of lithium ion secondary battery. However in case of water reaction media, a convention Taylor Vortex reactor which is not pressurized does not show its intrinsic synthesis feature over 100 C because liquid-phase changes to gas-phase. See FIG. 4. However, the reaction apparatus claimed in this invention with capillary pressure letdown apparatus, the water reaction media is maintained in the liquid-phase by applying adequate pressure according to reaction temperature.

Figure 5:
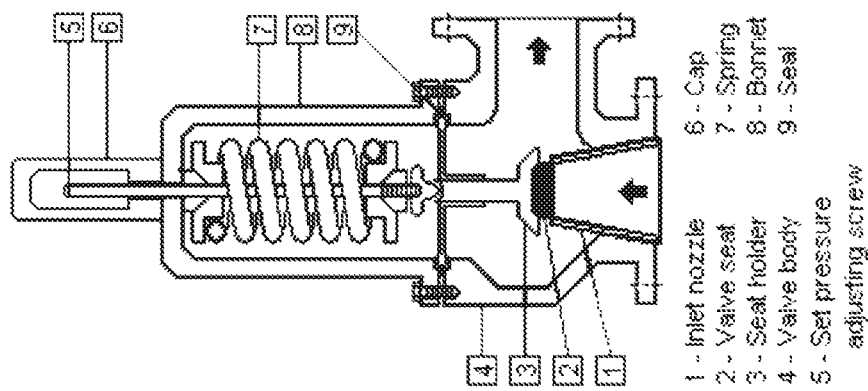
FIG. 5 is a schematic or a conventional spring-loaded pressure relief valve.

Typically a pressurized continuous reaction system needs a special pressure letdown apparatus to discharge a produce continuously keeping reaction pressure constant at the same time. FIG. 5 illustrates a schematic diagram of a convention spring-loaded pressure relief valve. This conventional pressure letdown apparatus is easily plugged by particle sedimentation and malfunctions when the product is abrasive material such as active material or its precursor used for a lithium ion second battery. The erosion of the valve seat of pressure relief valve triggers the contamination of the product. This valve seat also makes the particle crack by pressing when synthesized particles discharge through the pressure relief valve. Here, however, with the pressurized Taylor vortex reactor with capillary pressure letdown apparatus, malfunction, plugging, erosion and particle crack are minimized during pressure letdown.

Figure 6:
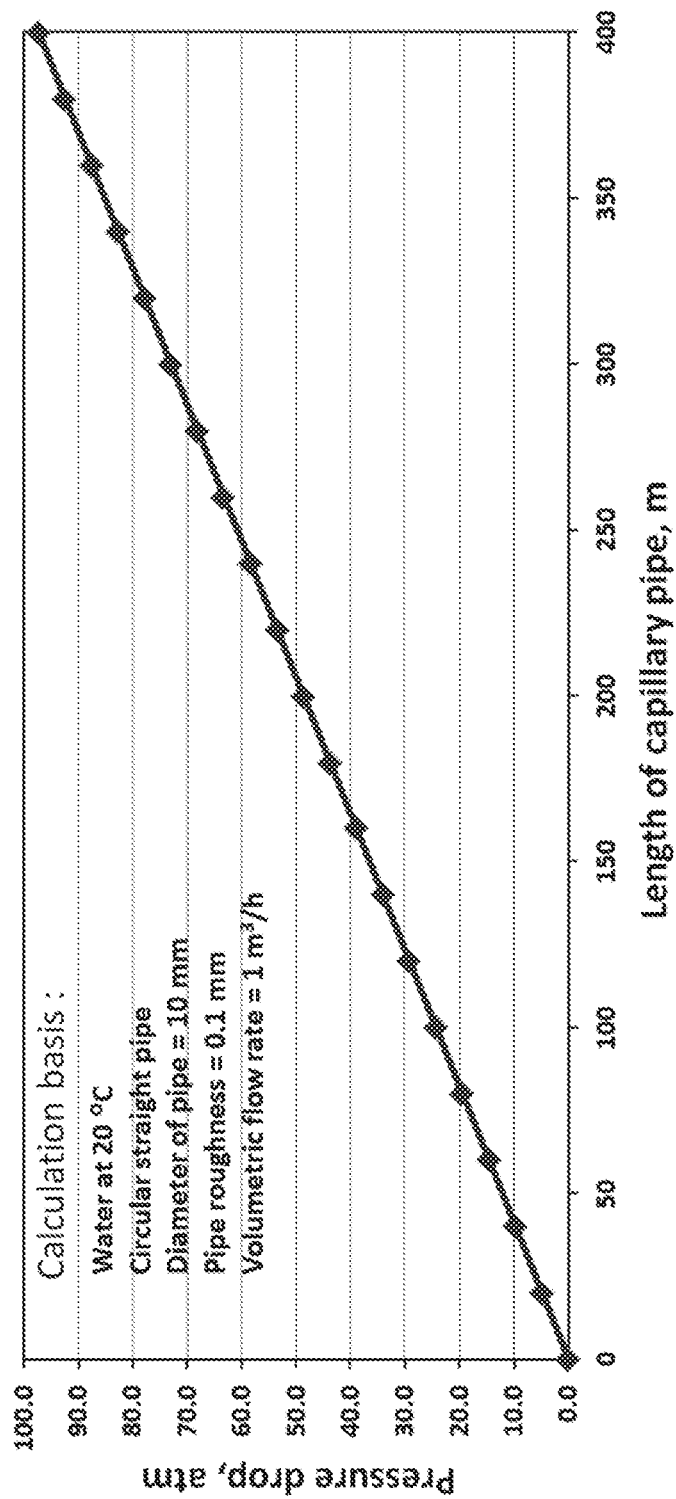
FIG. 6 is a graph of pressure drop according to the length of capillary pipe.

FIG. 6 illustrates an example of pressure drop according to the length of capillary pipe which is commercial scale. When the volumetric flow rate, 1 m3/h, of water goes through a 400 meter length pipe with an internal diameter of 10 millimeters, the reaction pressure at the pipe inlet of 100 atmospheres will be reduced to atmospheric pressure at the product outlet at the pipe outlet based on hydrodynamic calculations. The actual tested results are shown below:

| CASE | Fluid phase (Volume %) | Tube diameter | Tube length | Volumetric flow rate | Pressure at tube inlet | Pressure at tube outlet |
| --- | --- | --- | --- | --- | --- | --- |
| 1 | 100% water | 1/8 inch | 20 meter | 2 L/min | 50 atm | 10 atm |
| 2 | 100% water | 1/8 inch | 200 meter | 1 L/min | 250 atm | 10 atm |
| 3 | 100% water | 1 inch | 150 meter | 230 L/min | 250 atm | 20 atm |

In summary, a reaction apparatus has been shown and described which can continuously produce sub-micron and/or micron sized particles by co-precipitation. The reaction apparatus enables the formation of Taylor vortices above the boiling temperature of reaction media for sub-micron or micron sized particle production thereby increasing the reaction efficiency by minimizing the volume possession of gas-phase by pressurizing. It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, 6. In particular, the use of "step of" in the claims herein is not intended to invoke the provisions of 35 U.S.C. § 112, 6.

The invention claimed is:

1. A reaction apparatus for mixing at least two reactants comprising:
 a reactor having a chamber, a stirring shaft, and an outlet port, the chamber having a hollow space, an axis x, and a predetermined pressure wherein the predetermined pressure is at least approximately 1 bar, the chamber receiving the at least two reactants;
 the stirring shaft rotatably mounted in the hollow space such that the stirring shaft rotates around the axis x, creating a Taylor vortex flow, thereby forming a reaction product;
 a depressurizer, the depressurizer fluidly connected to the outlet port, the depressurizer configured to depressurize the reaction product, a storage tank connected to the depressurizer.

2. The reaction apparatus of claim 1, and further including a heat exchanger, the heat exchanger disposed between the outlet port and the depressurizer, the heat exchanger configured to cool the reaction product.

3. The reaction apparatus of claim 1, and further including at least two inlet ports disposed in the chamber, a high pressure pump connected to each respective inlet port.

4. The reaction apparatus of claim 1, wherein one of the at least two reactants has a temperature of at least approximately 50° C.

5. The reaction apparatus of claim 1, wherein the at least two reactants have a temperature of at least approximately 50° C.

6. The reaction apparatus of claim 1, wherein the reactor has a temperature of at least approximately 50° C.

7. The reaction apparatus of claim 1, and further including a heater, the heater disposed between the high pressure pump and the respective inlet port, the heater configured to heat the respective reactant to a predetermined temperature.

8. The reaction apparatus of claim 1, and further including a first heater and a second heater, the first heater disposed between one of the high pressure pumps and the respective inlet port, the second heater disposed between the other high pressure pump and the respective inlet port, each heater configured to heat the respective reactant to a predetermined temperature.

9. The reaction apparatus of claim 1, wherein at least two storage tanks are connected to each of the at least two high pressure pumps.

10. The reaction apparatus of claim 1, wherein a drive motor is configured to provide rotational force to the stirring shaft.

11. The reaction apparatus of claim 1, wherein the stirring shaft rotates at a speed of at least approximately 100 rpm.

12. The reaction apparatus of claim 1, wherein the stirring shaft rotates at a speed of between approximately 100 rpm and 2000 rpm.

13. The reaction apparatus of claim 1, wherein each of the at least two reactants is a solid reactant, a liquid reactant, a gaseous reactant, or a combination thereof.

14. The reaction apparatus of claim 1, wherein at least one of the reactants has a predetermined temperature from between approximately 50° C. and 374° C.

15. The reaction apparatus of claim 1, wherein the predetermined pressure is between approximately 1 to 220 bars.

16. The reaction apparatus of claim 1, wherein the depressurizer is a capillary pressure letdown apparatus.

17. The reaction apparatus of claim 1, wherein the depressurizer is a pressure-reducing regulator.

* * * * *